(12) United States Patent
Rathgeb et al.

(10) Patent No.: US 11,460,044 B2
(45) Date of Patent: Oct. 4, 2022

(54) HALF-SPIRAL HOUSING

(71) Applicant: ebm-papst Mulfingen GmbH & Co. KG, Mulfingen (DE)

(72) Inventors: Josef Rathgeb, Jagstzell (DE); Oliver Haaf, Kupferzell (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 182 days.

(21) Appl. No.: 16/801,651

(22) Filed: Feb. 26, 2020

(65) Prior Publication Data
US 2020/0191163 A1 Jun. 18, 2020

Related U.S. Application Data

(63) Continuation of application No. PCT/EP2018/075938, filed on Sep. 25, 2018.

(51) Int. Cl.
*F04D 29/42* (2006.01)
*F04D 17/06* (2006.01)
*F04D 29/66* (2006.01)

(52) U.S. Cl.
CPC ......... *F04D 29/4226* (2013.01); *F04D 17/06* (2013.01); *F04D 29/661* (2013.01)

(58) Field of Classification Search
CPC .. F04D 29/403; F04D 29/4226; F04D 29/661; F04D 17/06; F04D 17/08; F04D 17/10; F05D 2200/23
See application file for complete search history.

(56) References Cited

U.S. PATENT DOCUMENTS 8,360,718 B2 * 1/2013 Dybenko .............. F04D 29/441
415/206
9,206,817 B2 12/2015 Mitsuishi et al.
(Continued)

FOREIGN PATENT DOCUMENTS

CN 106627040 A 5/2017
DE 3238913 C2 10/1985
(Continued)

OTHER PUBLICATIONS

Translation of DE102005012815 (Year: 2005).*
(Continued)

*Primary Examiner* — Eldon T Brockman
*Assistant Examiner* — Brian O Peters
(74) *Attorney, Agent, or Firm* — Harness, Dickey & Pierce, P.L.C.

(57) ABSTRACT

A radial fan half-spiral housing has a pressure chamber extending in the circumferential direction about an axial intake opening (5) to a radial blow-out opening (31). The pressure chamber, as viewed in the circumferential direction, is subdivided into at least one beginning portion (7), one central portion (8), and one blow-out portion. The intake opening (5) determines a central axis of rotation for a fan wheel. An averaged half-spiral housing radius, as viewed about the axis of rotation (11), varies in the beginning portion (7), the center portion (8), and the blow-out portion (9). It reaches a maximum in the blow-out portion (9). The center portion (8) of the half-spiral housing radius is reduced in a region determining a maximum height H(δ,z) of the half-spiral housing (1) compared to a logarithmic spiral radius ($r_{log}$).

14 Claims, 4 Drawing Sheets

(56) References Cited

U.S. PATENT DOCUMENTS

| | | |
|---|---|---|
| 2004/0253092 A1 | 12/2004 | Hancock |
| 2005/0096767 A1 | 5/2005 | Chen |
| 2011/0189004 A1 | 8/2011 | Dybenko et al. |
| 2013/0017079 A1* | 1/2013 | Armstrong ................ A47L 5/14 |
| | | 415/204 |
| 2013/0142615 A1 | 6/2013 | Hancock |

FOREIGN PATENT DOCUMENTS

| | | |
|---|---|---|
| DE | 102005012815 * | 3/2005 |
| DE | 102009031552 A1 | 2/2010 |
| DE | 102009033776 A1 | 1/2011 |
| DE | 202015105776 U1 | 11/2015 |
| DE | 102014116047 A1 | 5/2016 |
| WO | WO-2017-071880 A1 | 5/2017 |

OTHER PUBLICATIONS

International Search Report dated Dec. 11, 2018 in corresponding PCT Application No. PCT/EP2018/075938.
Index Appendices from GPTO Search Report dated Jun. 27, 2018 in corresponding German Application No. 102017122987.6.

* cited by examiner

HALF-SPIRAL HOUSING

CROSS-REFERENCE TO RELATED APPLICATIONS

This application is a continuation of International Application No. PCT/EP2018/075938, filed Sep. 25, 2018, which claims priority to German Application No. 10 2017 122 987.6, filed Oct. 4, 2017. The disclosures of the above applications are incorporating herein by reference.

FIELD

The present disclosure relates to a fan and, more particularly, to a half-spiral housing of a radial fan.

BACKGROUND

Radial fans half-spiral housings are known from the prior art. They are used, for example, in the roof-mounted climate-control systems for buses. In this case, the half-spiral housings extend in the circumferential direction over 180° of a logarithmic spiral. They are integrated into the evaporator unit as a part of the radial fan. The air is suctioned axially, via an intake opening, and blown out radially after passing through the pressure chamber. In the prior art, spiral pressure chambers, with a logarithmic spiral radius, are used. The logarithmic spiral radius is defined mathematically by the size of the pressure chamber. Therefore, it leads to a predefined installation height of the half-spiral housing.

The installation height is very limited in locations of use such as in roof-mounted climate-control systems. The object upon which the disclosure is based is to provide a half-spiral housing with reduced installation space requirements. In addition, it should be foreseeable that the half-spiral housing is not or only slightly negatively affected with respect to efficiency and noise development.

SUMMARY

The object is achieved by a half-spiral housing of a radial fan including a pressure chamber extending in the circumferential direction about an axial intake opening to a radial blow-out opening. The pressure chamber, viewed in the circumferential direction, is subdivided into at least one beginning portion, one central portion, and one blow-out portion. The intake opening determines a central axis of rotation for a fan wheel. An averaged half-spiral housing radius, viewed about the axis of rotation, varies in the beginning portion, the center portion, and the blow-out portion, and reaches a maximum in the blow-out portion. In the center portion, the half-spiral housing radius is reduced in a region determining a maximum height $H(\delta,z)$ of the half-spiral housing compared to a logarithmic spiral radius ($r_{log}$).

According to the disclosure, a radial fan half-spiral housing has a spiral pressure chamber extending in the circumferential direction about an axial intake opening to a radial blow-out opening. The half-spiral housing is subdivided. When viewed in the circumferential direction, it has at least a beginning portion, a central portion, and blow-out portion. The intake opening determines a central axis of rotation for a fan wheel and the center of the spiral. The disclosure has an averaged half-spiral housing radius, as viewed about the axis of rotation, that varies in the beginning portion, central portion, and blow-out portion. It has its maximum radius in the blow-out portion. The half-spiral housing radius is reduced in the central portion in a region determining a maximum height of the half-spiral housing, as compared to a logarithmic spiral radius. The shape of the logarithmic spiral is determined, via the logarithmic spiral radius, as a function of the circumferential angle about the axis of rotation. Thus, its extension and/or its curve is defined mathematically. The gradient angle in this case can be defined variably and as needed.

The result of this is that the maximum height of the half-spiral housing is locally reduced compared to a half-spiral housing with a half-spiral housing radius that corresponds to the logarithmic spiral radius, as viewed in the circumferential direction, in the region of the central portion determining the maximum height of the half-spiral housing. Therefore, the half-spiral housing, according to the disclosure, is built compactly. It can also be integrated, for example, into rounded edge areas of the evaporator units of roof-mounted climate-control systems of buses, in a regular location of use.

In one advantageous embodiment of the half-spiral housing, with respect to efficiency and noise development, the half-spiral housing has an axial widening of the pressure chamber, at least in the central portion. The axial widening enlarges a flow cross-sectional surface of the pressure chamber by a value. This corresponds at least to the value by which the flow cross-sectional surface of the pressure chamber is reduced due to the reduction of the central portion as compared to the logarithmic spiral radius. Thus, the losses of the flow cross-section due to a radial installation space reduction are evened out by an axial widening. Furthermore, this enables the pressure conversion of the dynamic pressure into static pressure within the spiral pressure chamber to be continually maintained over the circumference. This facilitates a high level of efficiency of the radial fan including the half-spiral housing.

In an advantageous design variant of the half-spiral housing, the half-spiral housing radius corresponds to the logarithmic spiral radius at least at a transition, in the circumferential direction, between the beginning portion and the central portion as well as between the central portion and the blow-out portion. In addition, in a refinement of the half-spiral housing, the beginning portion and the blow-out portion have an extension in the circumferential direction along the logarithmic spiral radius. This means that the geometry of the half-spiral housing is adapted, in the previously described manner, as compared to a spiral shape corresponding to the logarithmic spiral radius, exclusively in the central portion of the pressure chamber. As viewed in the circumferential direction, the remaining portions extend according to the logarithmic spiral radius.

As an exemplary embodiment, the disclosure additionally includes a half-spiral housing. The half-spiral housing radius, in order to do this, is reduced in an axial direction in the central portion of the pressure chamber. For example, one axial half of the half-spiral housing may have less radial extension than the other axial half of the half-spiral housing.

In a further beneficial embodiment of the half-spiral housing, a radial extension of the pressure chamber is reduced in the region of the central portion determining the maximum height of the half-spiral housing. The reduction is from a first axial side of the half-spiral housing to an opposite second axial side of the half-spiral housing, preferably over the entire width. In doing so, a radial pressure chamber wall, i.e. the pressure chamber wall connecting the axial sides of the half-spiral housing, extends in an angle range $\delta=1°-20°$, more preferably in an angle range $\delta=3°-12°$. It is tilted compared to the axis of rotation and/or compared to an axial plane extending parallel to the axis of rotation. The tilt causes a pressure chamber curve that extends, as viewed in a radial sectional view, from one axial side to the other axial side of the half-spiral housing. It extends in relation to the axis of rotation such that the radial extension of the pressure chamber is reduced over the entire axial width in the axial direction. Thus, the radially outermost region of the pressure chamber has a substantially triangular shape, as viewed in the radial section. The corners may be rounded.

It has been found to be an advantageous embodiment, from an optimized flow perspective, when the beginning portion, as viewed in the circumferential direction, extends about the axis of rotation in the circumferential direction over an angle range of α=20°-110°, more preferably over an angle range of α=40°-75°. The central portion extends over an angle range of β=30°-200°, more preferably over an angle range of β=120°-160° about the axis of rotation.

In a further advantageous embodiment, from an optimized flow perspective, the half-spiral housing transitions extend tangentially, as viewed in the circumferential direction. The transitions are between the beginning portion and the central portion as well as between the central portion and the blow-out portion.

In one refinement, the half-spiral housing is formed from two axial side parts. The imaginary axial separating line, in this case, may extend axially through the half-spiral housing in the middle. The design freedom for adapting the pressure chamber geometry is significantly greater with a two-part design.

In one embodiment, one of the two side parts is reduced more than the second side part extensively in the central portion in an axial direction opposite the logarithmic spiral radius.

Furthermore, in a further design variant of the half-spiral housing, the intake opening has an inlet nozzle extending parallel to the axis of rotation. The flow cross-section of the inlet nozzle is reduced over its axial curve. The tapering of the pressure chamber directly connects the intake opening and the inlet nozzle. This occurs in the central portion in the radial direction due to the locally reduced half-spiral housing radius as compared to the logarithmic spiral radius.

In another advantageous half-spiral housing, the flow cross-sectional surface, from an optimized flow perspective, is formed as an oval, ellipse, rectangle, or rectangle with rounded corners in the beginning portion and blow-out portion of the pressure chamber.

Furthermore, an embodiment is beneficial where a blow-out surface of the half-spiral housing is formed by the blow-out portion. It is shaped as a rectangle or rectangle with rounded corners.

A refinement of the half-spiral housing additionally provides a convexly shaped air-inlet grille arranged at the intake opening or the inlet nozzle. The air-inlet grille influences the inflow and directs the suctioned air flow, in a predetermined manner, into the inlet nozzle and intake opening with its grille bars. Thus, additional noise is prevented from a disturbed inflow, for example due to an asymmetrical intake situation.

Other advantageous further developments of the disclosure are described in the dependent claims and/or are shown in more detail in the following figures, along with the description of the preferred embodiment of the invention. The following is shown.

DRAWINGS

Further features and advantages of the disclosure result from the subsequent description of exemplary embodiments with reference to the enclosed figures.

DETAILED DESCRIPTION

Equivalent reference numerals indicate the same parts in all views.

FIGS. 1-4 illustrate a perspective view, a side view and two sectional views, A-A and C-C of a half-spiral housing 1 for a radial fan. The half-spiral housing 1 is composed of two side parts 3, 4. They include an axial intake opening 5 on side part 3. Air is suctioned axially through the opening 5 and blown out radially over the substantially rectangular blow-out surface 10. An opening 15, to the motor assembly, is formed on side part 4 on the opposite axial side. The center of the intake opening 5 has an axis of rotation 11 for a fan wheel (not shown) that rotates in the half-spiral housing 1 during operation. The half-spiral housing 1 forms, in the interior, a pressure chamber. The pressure chamber extends about the intake opening 5. The pressure chamber converts the dynamic pressure to static pressure. As viewed in the circumferential direction, the pressure chamber is subdivided into a beginning portion 7, a central portion 8, and a blow-out portion 9.

The beginning portion 7 extends, in the circumferential direction, about the axis of rotation 11 over the angle of from about 20°-110°, preferably 40°-75° and most preferred α=60° along the logarithmic spiral radius $r_{log}$. It passes tangentially to the central portion 8. The central portion 8 extends over an angle of from about 30°-200° preferably 120°-160° and most preferred β=140° about the axis of rotation 11. This is particularly shown in FIGS. 2 and 4. The blow-out portion 9 extends over the remaining angle range up to the blow-out surface 10. The blow-out portion 9 continues along the logarithmic spiral radius $r_{log}$, just as the beginning portion 7.

Figure 2:
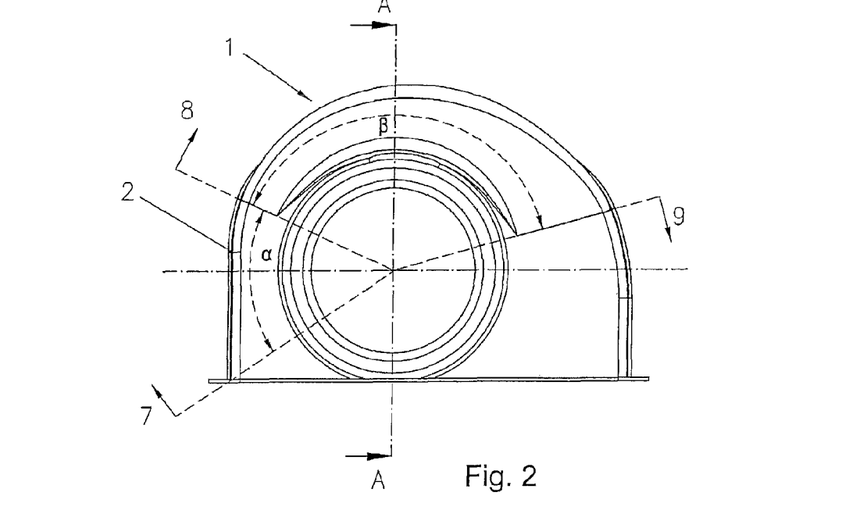
FIG. 2 is an elevational side view of the half-spiral housing from FIG. 1.
Figure 3:
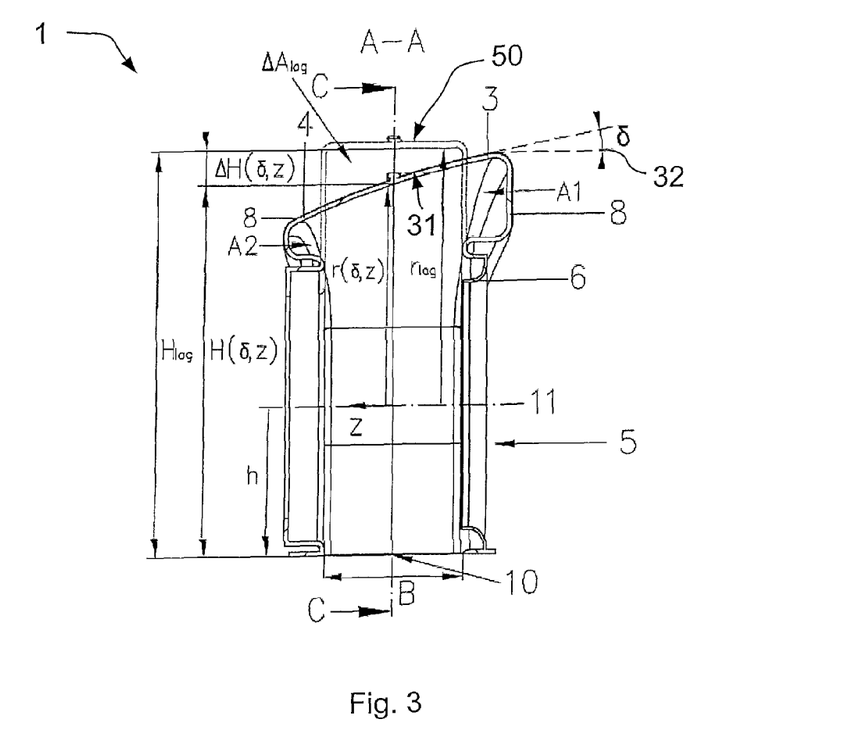
FIG. 3 is a sectional view along line A-A of the half-spiral housing of FIG. 2.

In the central portion 8, the half-spiral housing 1 has its maximum height H. However, it does not extend along the logarithmic spiral radius $r_{log}$. Instead, the central portion 8 has a reduced averaged half-spiral housing radius. Thus, it is formed smaller in the radial direction. In the embodiment shown, this can most clearly be seen in the sectional view according to FIG. 3. Here, the reduction of the averaged half-spiral housing radius is achieved by the radial pressure chamber wall 31 tilted at about an angle from 1°-20° and preferably δ3°-12° most preferred δ=7° as compared to the axial plane 32. The axial plane 32 extends parallel to the axis of rotation 11. The actual half-spiral housing radius r(δ,z) is dependent on the axial position z as well as the angle δ. It is reduced in the axial direction from the outer wall of side part 3 in the direction of the outer wall of side part 4. The maximum height H(δ,z) of the half-spiral housing 1 is reduced by the value Δh(δ,z) as compared to a conventional half-spiral housing with the logarithmic spiral radius $r_{log}$ and a maximum height H log. This results in a reduction in the flow cross-sectional surface of ΔAlog. The maximum height H(δ,z) can be calculated as $$H(\delta,z)=H \log-\Delta h(\delta,z)=H \log-(r_{log}-r(\delta,z))=h+r(\delta,z),$$

h determines the vertical distance from the axis of rotation 11 to the blow-out surface 10. FIG. 3 shows a sectional view along line A-A of FIG. 2. Consequently, the flow cross-sectional surface in the central portion 8 is within the angle range β with the curve of the half-spiral housing radius r(δ,z) through the two side parts 3, 4. The two surfaces A1 and A2 form an axial widening of the pressure chamber in the central portion 8. This is compared to the outer wall surfaces of the side parts 3, 4 with the width B. This compensate for the reduction in the flow cross-sectional surface ΔAlog. Thus, ΔAlog=A1+A2 applies. The radially outermost region of the pressure chamber in the central portion 8 has a substantially triangular shape with rounded corners in the radial section according to FIG. 3.

Figure 4:
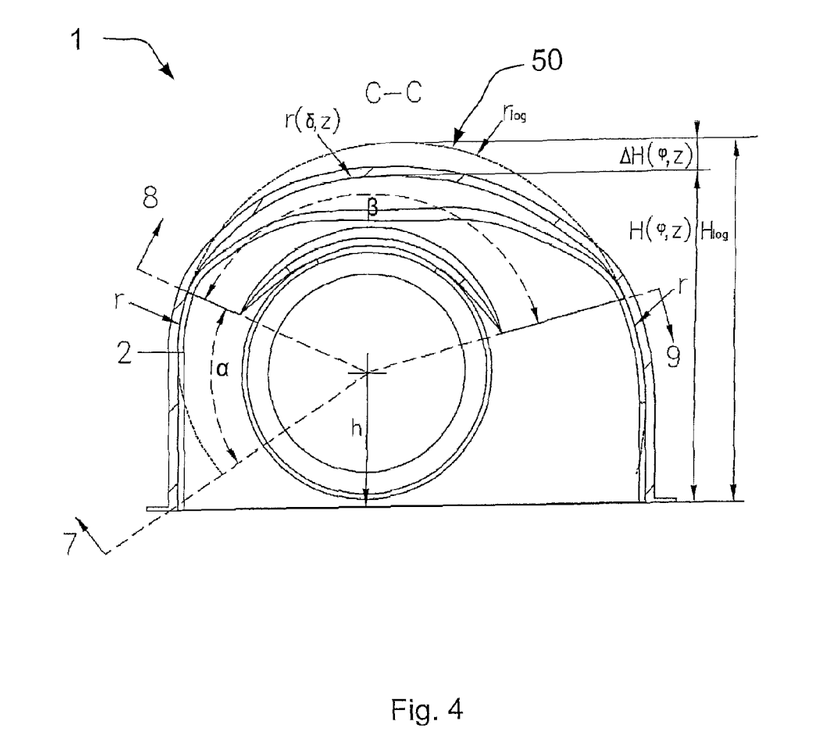
FIG. 4 is a sectional view along line C-C of the half-spiral housing of FIG. 2.

Also, in FIGS. 3 and 4, the curve of the central portion along the logarithmic spiral radius $r_{log}$ is shown schematically, in a dashed line. This is in comparison with the conventional half-spiral housing shape 50 (not part of the disclosure) results. This illustrates a significantly greater maximum height H log.

Figure 1:
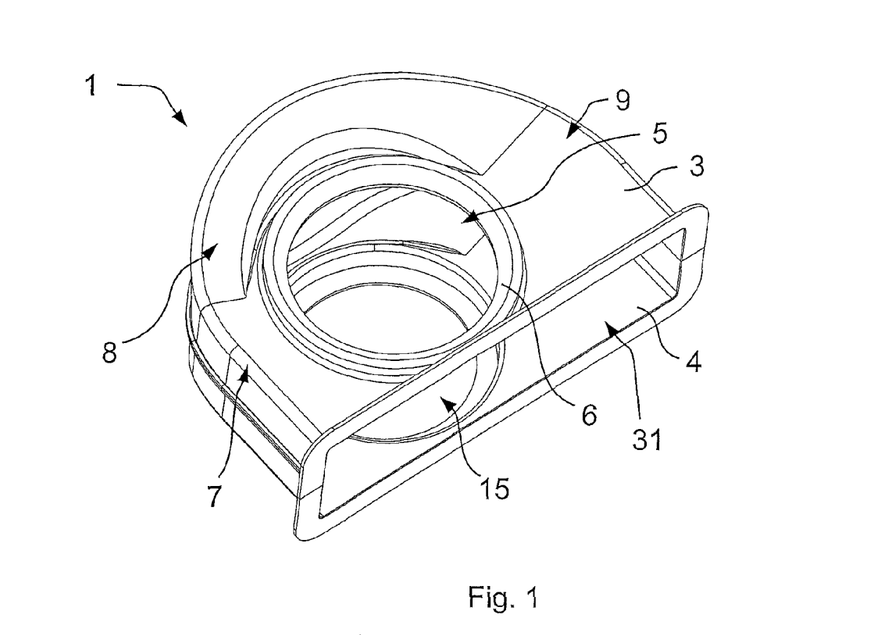
FIG. 1 is a perspective view of an exemplary embodiment of a half-spiral housing.
Figure 5:
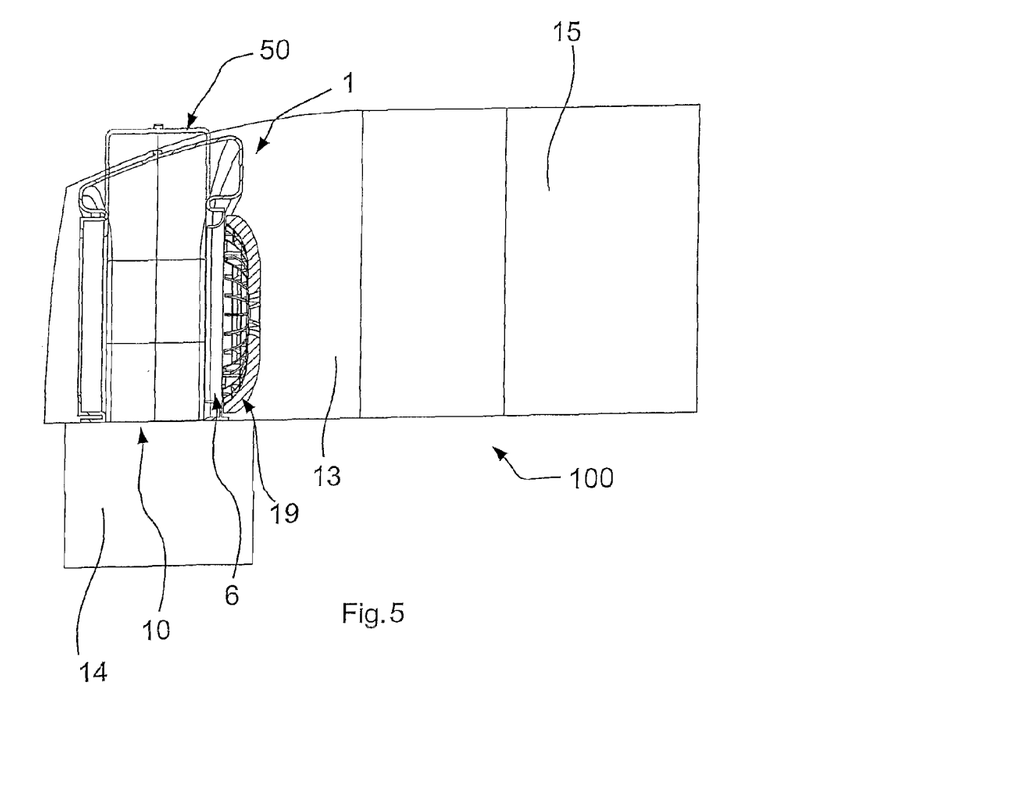
FIG. 5 is a cross-section view of the half-spiral housing in an installation situation of FIG. 1.

FIG. 5 shows an installation situation of the half-spiral housing 1 from FIG. 1 in a roof-mounted climate-control system 100. Particularly shown is an edge section of an evaporator unit 13 with a conventional rounded cross-sectional shape. Consequently, limited space is available on the outer edge. The half-spiral housing 1 is shown similarly to the sectional view according to FIG. 3. The conventional half-spiral housing shape 50 (not part of the disclosure) does not fit in such an evaporator unit 13, as shown by the dashed line. The adaptation of the central portion 8 makes it possible, with the half-spiral housing 1, for the evaporator unit 13 to remain within the outer contour. In addition, the exemplary embodiment additionally shows the arrangement of the convexly shaped air-inlet grille 19 on the inlet nozzle 6 in order to influence the inflow as previously described. A heat exchanger 15 is connected to the evaporator unit 13. A channel 14, into which the radial fan (not shown) blows out, is connected to the blow-out surface 10 of the half-spiral housing 1.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A half-spiral housing of a radial fan comprising:
a pressure chamber extending in the circumferential direction about an axial intake opening to a radial blow-out opening, the pressure chamber, viewed in the circumferential direction, is subdivided into at least one beginning portion, one central portion, and one blow-out portion;
the intake opening determines a central axis of rotation for a fan wheel;
an averaged half-spiral housing radius, viewed about the axis of rotation, varies in the beginning portion, the center portion, and the blow-out portion, and reaches a maximum in the blow-out portion; and
in the center portion, the averaged half-spiral housing radius is reduced in a region determining a maximum height H(δ,z) of the half-spiral housing compared to a logarithmic spiral radius ($r_{log}$); and
the averaged half spiral housing radius is achieved by a radial pressure chamber wall that is tilted as compared to an axial plane, which extends parallel to the axis of rotation, and the radial pressure chamber wall is tilted from the intake opening wall towards an opposing sidewall such that the spiral radius is reduced in the axial direction from the intake opening wall in the direction of the opposing sidewall.

2. The half-spiral housing according to claim 1, wherein an axial widening (A1, A2) of the pressure chamber occurs at least in the central portion, the axial widening (A1, A2) enlarges a flow cross-sectional surface of the pressure chamber by a value, which corresponds at least to a value where the flow cross-sectional surface of the pressure chamber is reduced due to the reduction of the central portion as compared to the logarithmic spiral radius ($r_{log}$).

3. The half-spiral housing according to claim 1, wherein the half-spiral housing radius corresponds to the logarithmic spiral radius ($r_{log}$) at least at a transition, in the circumferential direction, between the beginning portion and the central portion as well as between the central portion and the blow-out portion.

4. The half-spiral housing according to claim 1, wherein the half-spiral housing radius is reduced in an axial direction (z) in the central portion of the pressure chamber of the half-spiral housing.

5. The half-spiral housing according to claim 1, wherein a radial extension of the pressure chamber in the region of the central portion determining the maximum height H(δ,z) of the half-spiral housing is reduced from a first axial side of the half-spiral housing to an opposite, second axial side of the half-spiral housing, and a radial pressure chamber wall extends in an angle range δ=1°-20°, tilted compared to the axis of rotation and/or compared to an axial plane extending parallel to the axis of rotation.

6. The half-spiral housing according to claim 1, wherein the beginning portion as viewed in the circumferential direction, extends over an angle range of α=20°-110°, and the central portion extends over an angle range of β=30°-200°.

7. The half-spiral housing according to claim 1, wherein the beginning portion and the blow-out portion have an extension in the circumferential direction along the logarithmic spiral radius ($r_{log}$).

8. The half-spiral housing according to claim 7, wherein transitions, as viewed in the circumferential direction, extend tangentially between the beginning portion and the central portion as well as between the central portion and the blow-out portion.

9. The half-spiral housing according to claim 1, wherein the half-spiral housing is formed from two axial side parts.

10. The half-spiral housing according to claim 9, wherein one of the two side parts is reduced more extensively in the central portion in an axial direction opposite the logarithmic spiral radius ($r_{log}$) than the second side part.

11. The half-spiral housing according to claim 1, wherein the intake opening has an inlet nozzle, the flow cross-section of the inlet nozzle is reduced.

12. The half-spiral housing according to claim 1, wherein a flow cross-sectional surface is formed as an oval, ellipse, rectangle, or rectangle with rounded corners in the beginning portion and blow-out portion of the pressure chamber.

13. The half-spiral housing according to claim 1, wherein a blow-out surface of the half-spiral housing is formed by the blow-out portion and is shaped as a rectangle or rectangle with rounded corners.

14. The half-spiral housing according to claim 11, wherein a convexly shaped air-inlet grille is arranged at the intake opening or the inlet nozzle.

\* \* \* \* \*

UNITED STATES PATENT AND TRADEMARK OFFICE
CERTIFICATE OF CORRECTION

| | | |
|---|---|---|
| PATENT NO. | : 11,460,044 B2 | Page 1 of 1 |
| APPLICATION NO. | : 16/801651 | |
| DATED | : October 4, 2022 | |
| INVENTOR(S) | : Josef Rathgeb | |

It is certified that error appears in the above-identified patent and that said Letters Patent is hereby corrected as shown below:

On the Title Page

Item (30) Foreign Application Priority Data please add:
October 4, 2017 (DE) 10 2017 122 987.6

Signed and Sealed this
Twenty-eighth Day of February, 2023

*Katherine Kelly Vidal*

Katherine Kelly Vidal
*Director of the United States Patent and Trademark Office*